(12) United States Patent
Radi et al.

(10) Patent No.: US 7,337,221 B2
(45) Date of Patent: Feb. 26, 2008

(54) SYSTEM AND METHOD FOR MANAGING INFORMATION FOR ELEMENTS IN A COMMUNICATION NETWORK

(75) Inventors: Tarek Radi, Kanata (CA); Martin R. Charbonneau, Ottawa (CA); Antonio Petti, Kanata (CA); Patricia Mary Clark, Ottawa (CA)

(73) Assignee: Alcatel Canada Inc., Kanata (CA)

( * ) Notice: Subject to any disclaimer, the term of this patent is extended or adjusted under 35 U.S.C. 154(b) by 837 days.

(21) Appl. No.: 10/321,647

(22) Filed: Dec. 18, 2002

(65) Prior Publication Data

US 2003/0131028 A1 Jul. 10, 2003

(30) Foreign Application Priority Data

Dec. 19, 2001 (CA) ................................. 2365681

(51) Int. Cl.
*G06F 15/173* (2006.01)
(52) U.S. Cl. ................. 709/223; 379/201.02; 379/269; 455/553.1; 455/466
(58) Field of Classification Search ................ 709/202, 709/229, 224, 225, 200, 203, 223, 249; 370/397, 370/467; 455/466, 519, 560, 553.1; 379/114, 379/201, 230; 719/318
See application file for complete search history.

(56) References Cited

U.S. PATENT DOCUMENTS

| | | | | |
|---|---|---|---|---|
| 5,621,728 A * | 4/1997 | Lightfoot et al. | ........... | 370/397 |
| 6,122,362 A * | 9/2000 | Smith et al. | ................ | 379/230 |
| 6,208,719 B1 * | 3/2001 | Lo et al. | ................ | 379/114.03 |
| 6,330,598 B1 * | 12/2001 | Beckwith et al. | ........... | 709/223 |
| 6,363,411 B1 * | 3/2002 | Dugan et al. | ............... | 709/202 |
| 6,463,141 B1 * | 10/2002 | Tuunanen et al. | ..... | 379/201.05 |
| 6,487,594 B1 * | 11/2002 | Bahlmann | ................... | 709/225 |
| 6,654,786 B1 * | 11/2003 | Fox et al. | ................... | 709/203 |
| 6,714,987 B1 * | 3/2004 | Amin et al. | ................ | 709/249 |
| 6,778,651 B1 * | 8/2004 | Jost et al. | ............... | 379/201.01 |
| 6,816,878 B1 * | 11/2004 | Zimmers et al. | ........... | 709/200 |
| 6,868,544 B2 * | 3/2005 | Dalal et al. | ................ | 719/318 |
| 6,954,654 B2 * | 10/2005 | Ejzak | ......................... | 455/560 |
| 6,978,145 B2 * | 12/2005 | Takaba et al. | ........... | 455/553.1 |
| 6,999,781 B1 * | 2/2006 | Wallenius | ................... | 455/466 |
| 7,158,805 B1 * | 1/2007 | Park et al. | ................... | 455/519 |
| 7,170,905 B1 * | 1/2007 | Baum et al. | ................ | 370/467 |
| 2004/0064571 A1 * | 4/2004 | Nuuttila | ..................... | 709/229 |

* cited by examiner

*Primary Examiner*—Dustin Nguyen
(74) *Attorney, Agent, or Firm*—McCarthy Tetrault LLP (57) ABSTRACT

The invention provides a system and method of managing service information in a network management system. The method includes the steps of loading the service information from a database into objects in a structure stored in a memory, receiving a change to be made to the service information, updating particular objects in accordance with the received change and sending a change notification to network nodes in accordance with a relationship in the structure between the particular objects.

14 Claims, 7 Drawing Sheets

CUG IC Profile List
508

| CUG IC Profile | Node | CUG Subscription |
|---|---|---|
| 500A | 102A | 504A, 504B |
|  |  |  |

512        514

CUG Subscription List
510

| CUG Sub. | Node | Subscription Service |
|---|---|---|
| 504A | Node 102A | SS 206A |
|  | Node 102B | SS 206N |
|  |  |  |

SYSTEM AND METHOD FOR MANAGING INFORMATION FOR ELEMENTS IN A COMMUNICATION NETWORK

FIELD OF THE INVENTION

The invention relates generally to a system and method for provisioning information, in particular, configuration information to elements in a communication network.

BACKGROUND OF INVENTION

In a communication network, a network station is a node, which centrally manages information about subscriber services associated with users of the communication network and information about the users (subscribers). As a communication network is a large dynamic system, with nodes and users constantly changing status therein, an efficient system is required in managing and updating service information and subscriber information by the network station, or other systems which may control configuration aspects of the communication network.

SUMMARY OF INVENTION

In an aspect of the invention, there is a provided method of managing service information in a network management system. The method comprises the steps of:
 a) loading the service information from a database into objects in a structure stored in a memory;
 b) receiving a change to be made to the service information;
 c) updating particular objects in accordance with the received change; and
 d) sending the change to network nodes in accordance with a relationship in the structure between the particular objects.

The method may have step d) comprising determining associations between the particular objects in the structure.

The method may have the information comprising an indication of a service to which a particular subscriber has subscribed.

The method may have the information further comprising an indication of a group to which a particular subscriber belongs.

In a second aspect, a method of managing information for services associated with a communication network at a network station is provided. The method comprises: maintaining service information relating to subscribers accessing nodes in the communication network; maintaining service profile information relating to the service information; receiving an update action relating to an entry in the service profile information; identifying affected service entries in the service information affected by the update action; identifying affected nodes in the communication network which are associated with the affected service entries; and providing each affected node with a revised profile relating to the update action.

The method may have the step of identifying affected nodes in the communication network comprising utilizing a set of lists to identify the affected nodes and updating the set to reflect the update action.

In the method, the service information and the service profile information may be stored as configuration information in memory local to the network station. Further, a copy of the configuration information may be stored at a remote database from the network station. Further still, data continuity may be evaluated between the configuration information and the copy.

In the method, the service information may be subscriber service information for each subscriber providing information identifying access information to the communication network and an address for each subscriber.

In the method, the service profile information may be subscriber profile information associated with entries in the subscriber service information.

In the method, the subscriber profiles may identify bearer services relating to the subscribers and each subscriber profile may be associated with at least one entry in the subscriber service information.

In the method, the service profile information may be user group profile information associated with entries in the subscriber service information identifying restrictions associated with entries in the subscriber service information.

In a third aspect, a method of managing address information for nodes in a communication network at a network station is provided. The method comprises: maintaining address translation profiles relating to the nodes; maintaining address translation profile groups identifying sets of address translation profiles related to the nodes, with each node having an address translation group profile of the address translation group profiles; receiving an update action relating to an affected address translation profile of the address translation profiles; and for each node having an address profile group affected by the update action, updating its address translation profile group to reflect a change to the affected address translation group.

In the method, each address translation group profile may further comprise identification of signalling links associated that profile group.

In the method, each address translation group may further comprise translation prefix information and termination address information.

In a fourth aspect, a system for managing a configuration request for a communication network at a network station associated with the communication network is provided which incorporates the aspects of the methods described above.

In a fifth aspect, a system for managing a configuration request for a communication network at a network station associated with the communication network is provided. The system comprises: a first module adapted to receive the configuration request; a second module adapted to determine an update action related to the configuration request; a third module adapted to identify a set of nodes in the network affected by the configuration request; and a fourth module adapted to initiate the update action to each node in the set of nodes. In the system, each node has first configuration information having an association with second configuration information. Further, the update action is related to the second configuration information and the update affects the first configuration information.

In the system, the first information may be subscriber service information providing information identifying access information to the communication network and an address for each subscriber to a node. Further, in the system, second information may be subscriber profile information associated with entries in the subscriber service information. Alternatively, in the system, the second information may be user group profile information associated with entries in the subscriber service information, identifying restrictions associated with entries in the subscriber service information.

Alternatively still, in the system, the first information may be address translation profile group information providing translation prefix information and termination address information and the second information may be address translation profile information providing identification of signalling links associated that profile group.

In other aspects of the invention, various combinations and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF EMBODIMENTS

Figure 1:
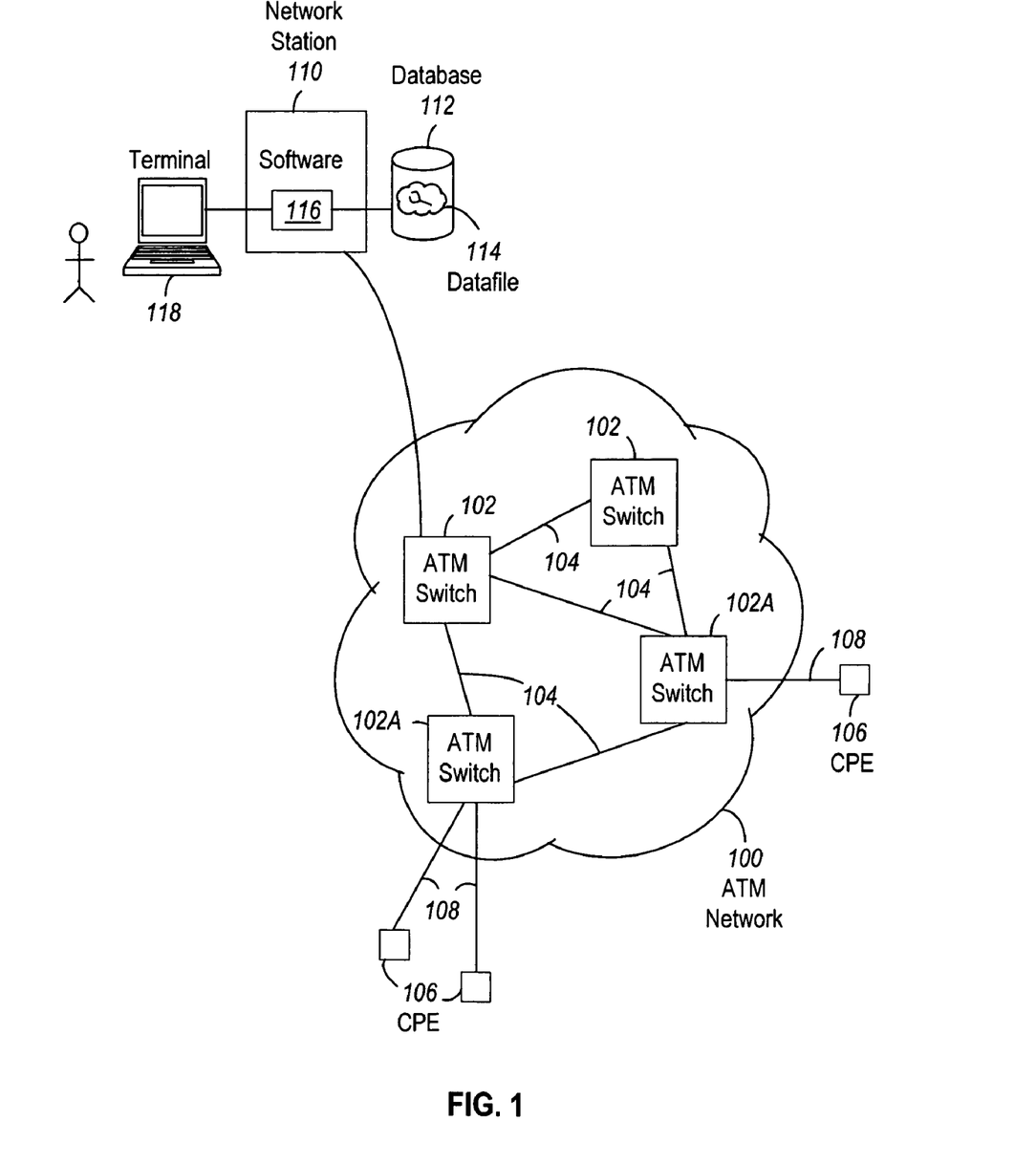
FIG. 1 is a block diagram of a communication network having a network station node from which a subscriber service is provisioned in accordance with an embodiment of the invention.

Referring to FIG. 1, network 100 is shown. Network 100 comprises a plurality of nodes 102, which are connected together via links 104. Each node 102 provides switching capabilities of data to other nodes or other devices. Customer Premise Equipment (CPE) 106 connects to an edge node 102A through link 108. Accordingly, a CPE 106 has a communication connection to network 100 and, to other CPEs 106. In the embodiment, nodes 102 are ATM switches providing cell-based routing of data traffic. It will be appreciated that other network topologies may be used. Further, node 102 may also be referred to as a network switch, a communication switch, a network element, a router and other terms known in the art.

Associated with network 100 is network station 110. Network station 110 is a special node which is used to configure and control operating aspects of network 100, through application software 116. In configuring and controlling network 100, network station 110 has access to database 112 which contains datafiles, or records, 114 relating to configuration information of network 100, nodes 102 and CPEs 106, amongst other files. Application software 116 operating on network station 110 reads records 114 from database 112 and receives configuration information from network 100 about its nodes 102 and connected CPEs 106. In the embodiment, configuration commands may be entered into network station 110 via an network administrator using terminal 118.

Figure 2A:
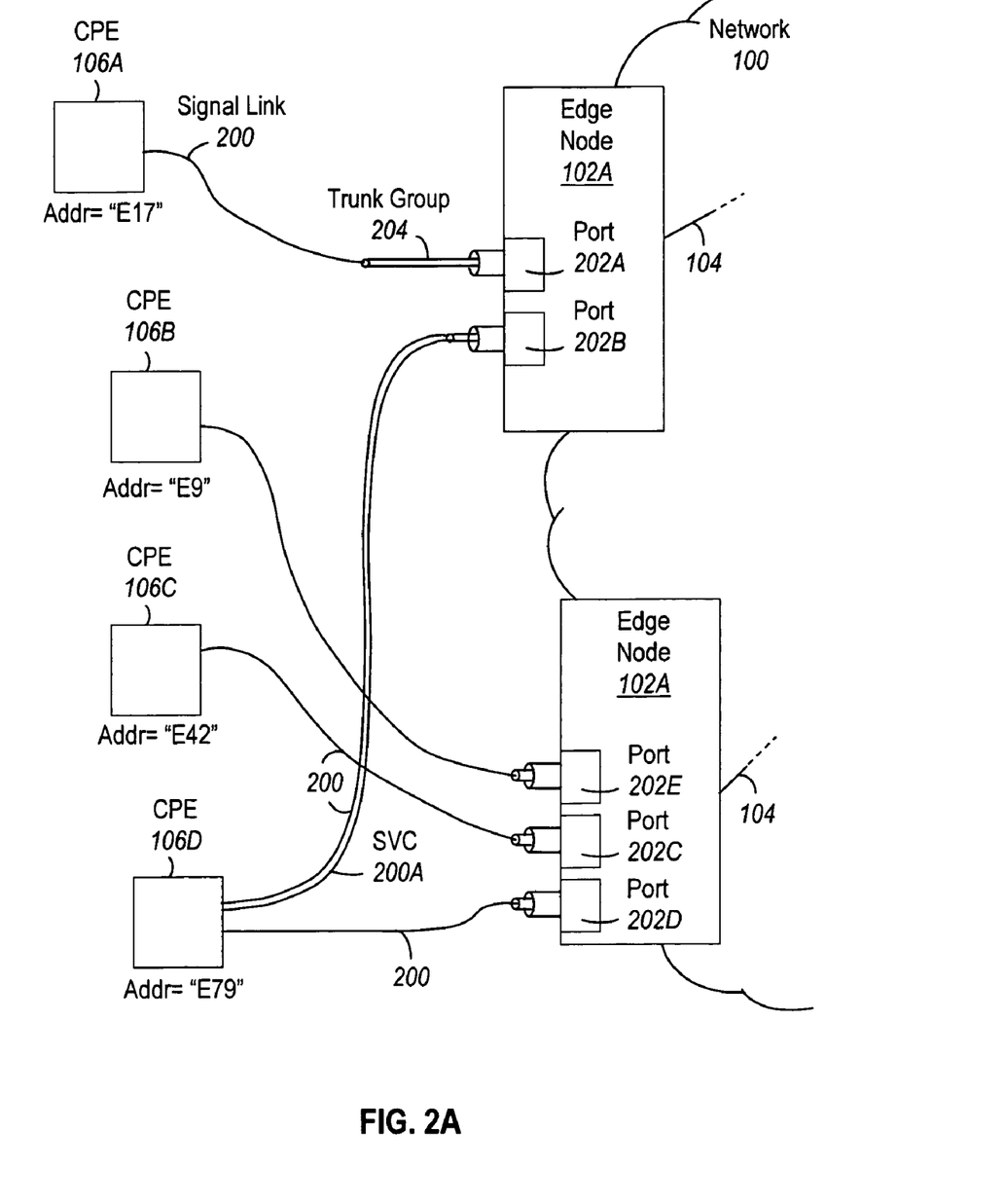
FIG. 2A is a block diagram of the subscriber services of FIG. 1 configured for access on a trunk group of the routing switch of FIG. 1.

Referring to FIG. 2A, relationships amongst subscribers at CPEs 106 to their connected nodes 106A and network 100 are shown. For the specification, the term subscriber is synonymous with the term CPE. Each CPE 106 is assigned an address (e.g. CPE 106A has address "E17", CPE 106B has address "E9", CPE 106C has address "E42" and CPE 106D has address "E79"). The address information may be stored at the node 102 associated with the CPE 106. The node 102 has the ability to identify and use the correct address information for a CPE 106 when routing data to it. To connect subscriber 106 with network 100, signalling link provides a logical connection between subscriber 106 and node 102A. A signalling link 200 carries messages between subscriber 106 and node 102A and is used to achieve Switched Virtual Connection (SVC) 200A services. As is known in the art, SVCs can be established on demand. Physically, signalling link 200 is carried in link 108 (FIG. 1), and connects subscriber 106 to a particular port 202 of node 102A. Port 202 may be embodied as a UNI OC3 link. A signalling link 200 can be associated with a trunk group 204 on a one-to-one basis, i.e. a trunk group 204 can only be associated with one signalling link 200 (see CPE 106A and CPE 106B). A port 202 is an access point for a signalling link 200; a port 202 can be associated with one or more signalling links 200 and one or more trunk groups 204. It will be appreciated that subscriber 106 may have several signalling links 200 associated with several nodes 106A (for example, subscriber 106D). Further, each node 102A may be associated with several signalling links 200 from several subscribers 106.

Figure 2B:
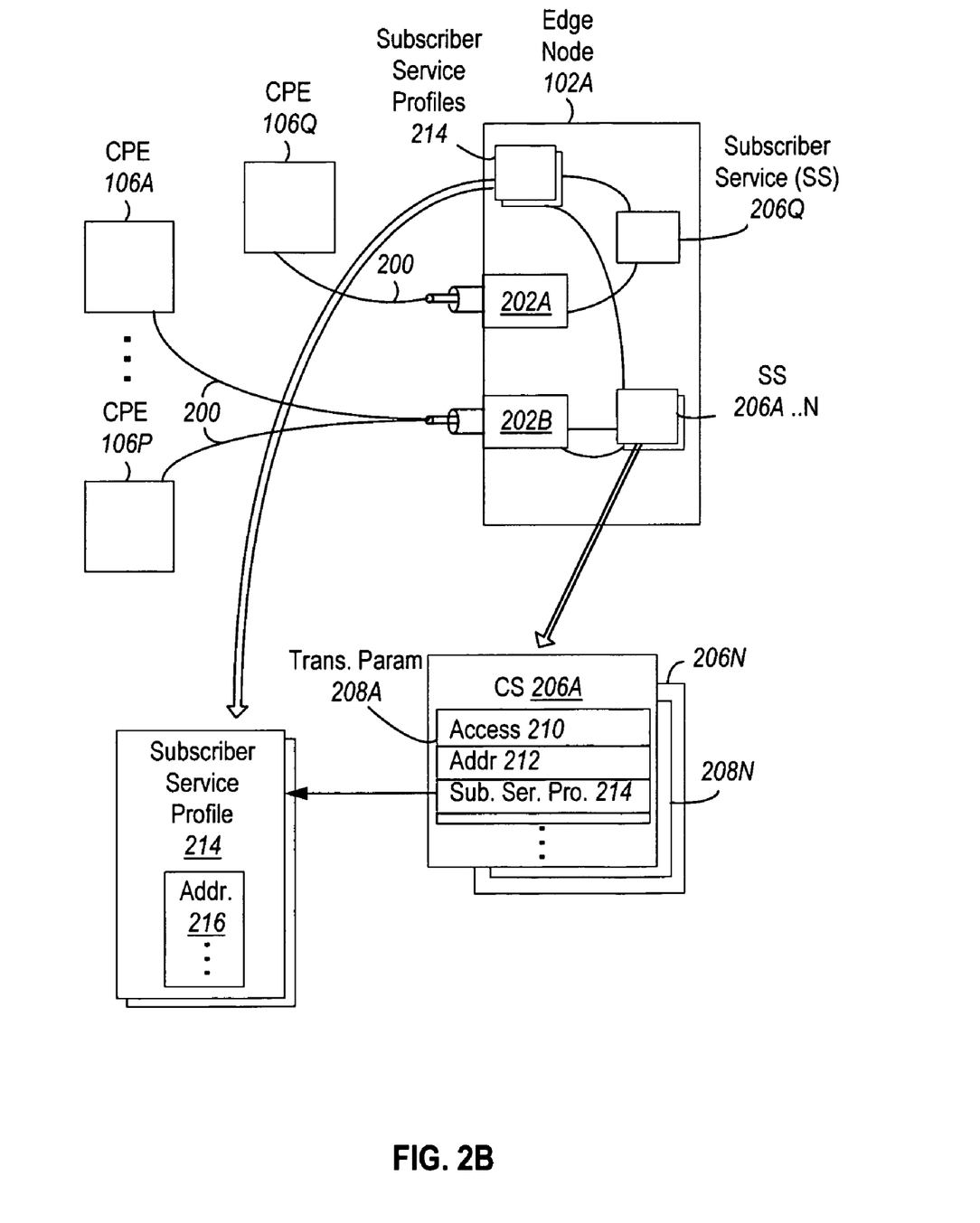
FIG. 2B is a block diagram of a subscriber service configuration list and a subscriber service profile list used when provisioning a subscriber service by the network station of FIG. 1.

Referring to FIG. 2B, in order to facilitate management of connection information for a node 102A, connection information for a port 202 is stored in node 102A in a table. In particular, the embodiment utilizes a subscriber service configuration table 206 (herein subscriber service 206) stored in local memory and a local database at node 102A. The subscriber service 206 provides a set of transmission service parameters 208 associated with an access point to node 102A, i.e. a port 202. The service parameters include: accounting parameters, connection descriptions and supplementary service attributes. Values for the parameters may be found in access parameter 210 (herein access 210), address parameter 212 (herein address 212), subscriber service profile parameter 214 (herein subscriber service profile 214) and a CUG subscription (to be described later). Each parameter is described in turn.

Access 210 is a record which is associated with a signalling link 200 on a port 202 of node 102A. Access 210 can be considered to be an abstraction of a signalling link 200. Each access 210 has a record 214 containing a port identifier 214A and signalling links 200 associated with that port 202 (noted as 214B). An access 210 with an address 212 (described below) can be used to identify a subscriber service 206. Also, for a subscriber 106, access 210 provides information of the termination point of its signalling link 200, namely, port 202.

Address 212 is associated with a subscriber service 206. Address 212 contains a record of an E.164, AESA or X.121 format directory number associated with subscriber service 206. As address 212 is associated with a subscriber service 206, within limitations, the subscriber service 206 is not directly bound to a node 102A and its use is not limited to that subscriber service 206.

It will be appreciated that for a subscriber service 206, information in access 210 combined with information in address 212 uniquely identifies the subscriber service 206. Accordingly, a subscriber 106 associated with the subscriber service 206 may also be uniquely identified. To illustrate the unique identification provided by the combination of access 210 with address 212, an analogy is made to a telephone number scheme and a user. A user may be uniquely identified by a name, and a telephone number and an area code. The telephone number is associated with the user and the area code is associated with the location of the user. Within certain limitations, the user may physically move, but still retain the same telephone number, which will be associated with the same area code. A subscriber may be uniquely identified by an address 212 (akin to a telephone number) and an access 210 (akin to an area code).

Subscriber service profile 214 is another table, specifying a set of bearer and supplementary services for a subscriber service 206. When a subscriber service 206 is created the subscriber service profile 214 is associated with the subscriber service 206. By way of example and not limitation, subscriber service profile 214 may comprise attributes 216 such as those listed below in Table A:

TABLE A

| Attribute 216 | Description |
|---|---|
| B-LLI | Broadband Lower Layer Indication (B-LLI) information element allows the parties of a call to perform lower layer protocol compatibility checking. |
| BRI | The Broadband Repeat Indication information element. |
| B-HLI | The Broadband Higher Layer Indication (B-HLI) information element allows the parties of a call to perform higher layer protocol compatibility checking. |
| AAL | The ATM Adaptation Layer Indication (AAL) information element allows end-to-end ATM adaptation layer parameters to be conveyed between the parties of a call. |
| CG | The Calling Party Indication (CG) information element conveys the address of the calling party to the parties of the call. This field corresponds to the "CLG" in the MPL. |
| Cgsub | The Calling Party Sub Address Indication (CGsub) information element conveys the sub-address of the calling party to the parties of the call. Item is also applicable to Frame Relay type Service Profiles. |

It will be appreciated that a subscriber service profile 214 may be associated with one or more subscriber services 206.

It will be appreciated that for a large network 100, comprising a large number of nodes 102, a large number of subscriber services 206 and subscriber service profiles 214 would be generated. Further as subscribers are added, deleted and have their services amended for nodes 106A, contents of any given subscriber service 206 and subscriber service profile 214 may change dynamically and continuously. For example, if a new subscriber service 206 for a subscriber 106 is required, any number of the following actions may need to be performed:

A subscriber record may need to be created;

A subscriber service profile 214 may need to be created;

An address 212 may need to be created or configured for the new subscriber service 206;

An access 210 may need to be created or configured for the new subscriber service;

A CUG-IC profile (described later) may need to be created;

The access 210, address 212, subscriber service profile 214 need to be associated with the subscriber service 206. Further, one or more CUG-IC profiles may need to be associated with the subscriber service to create one or more CUG subscriptions (described later). The new subscriber record may have to be associated with the subscriber service;

The subscriber service 206 must be saved and commissioned.

Accordingly, to facilitate maintenance of these tables, software 116 on network station 110 performs maintenance functions relating to records for subscribers 106, subscriber services 206, subscriber service profiles 214, access 210, address 212 and others. Software 116 manages a pool of subscriber service profiles 214 and downloads individual subscriber service profiles 214 to nodes 102A when necessary. Upon receiving a downloaded subscriber service profile 214, a node 102A maps the profile contained therein to its local subscriber profile. Further, network station 110 can examine each subscriber service profile 214 to identify all nodes 102 using that subscriber service profile 214. A description of the operation of software 116 follows, in relation to the maintenance and downloading of files to nodes 102 in network 100, in particular subscriber services 206, subscriber service profiles 214, access 210, address 212 and others. Further, as noted above, as there may be thousands of records which are updated and downloaded, the embodiment utilizes local memory in network station 110 in order to reduce the number of accesses required to its associated disk storage.

Figure 3:
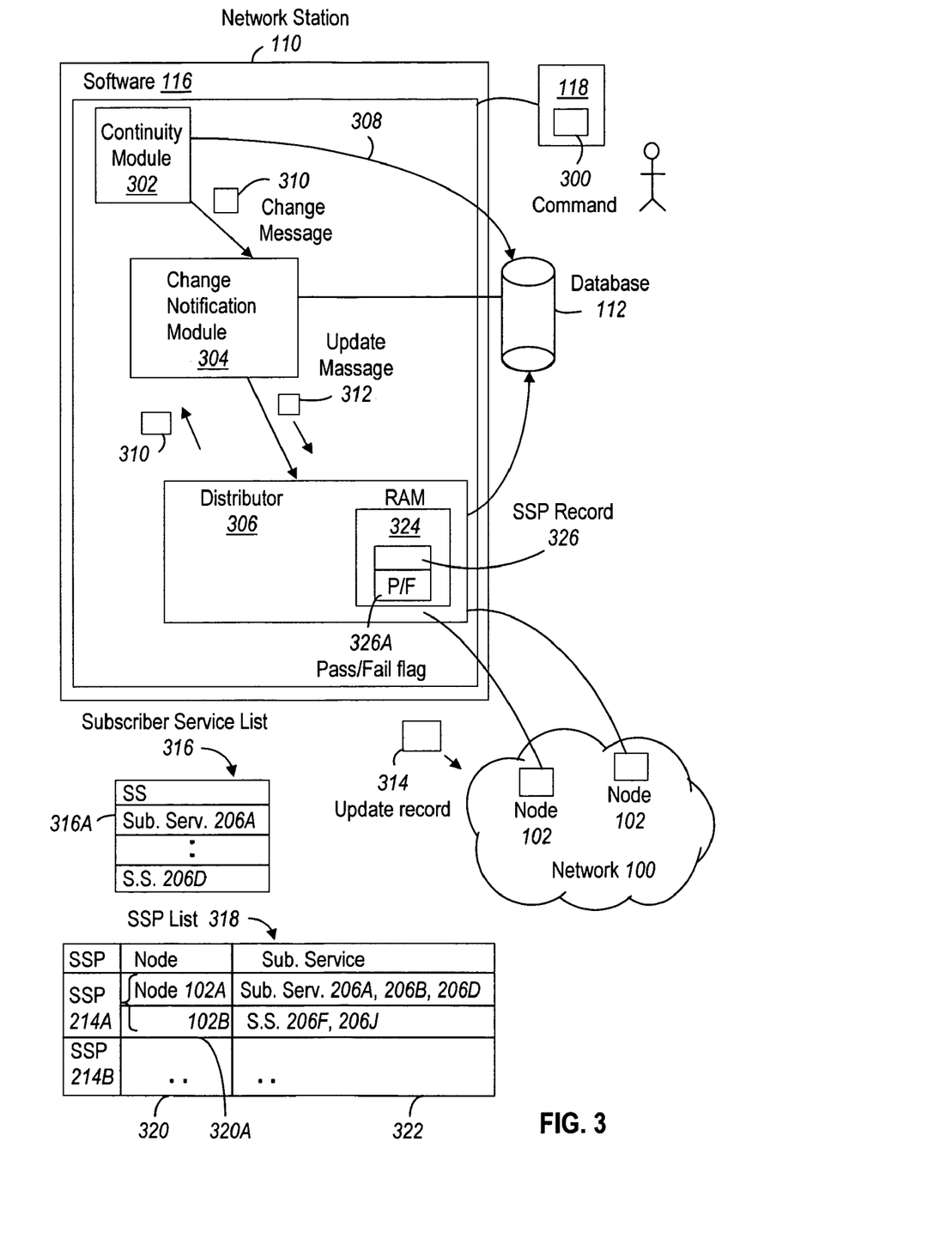
FIG. 3 is a block diagram of functional modules of the software application of the network station of FIG. 1.

Referring to FIG. 3, network station 110 is shown connected to network 100 and database 112. Software 116 is running on network station 110. In the embodiment, software 116 is implemented in C, C++ and java; it will be appreciated that other programming languages may be employed to implement the functionality of software 116. Software 116 comprises the following modules, amongst others: continuity module 302, change notification module 304 and distributor 306. Each module is described in turn below.

As maintenance of network 100 is handled by network station 110, operator can control aspects of nodes 106, including amending their subscriber services 206 and subscriber service profiles 214 by entering an appropriate command 300 on terminal 118. Alternatively, a command 300 may be automatically generated locally at a node 102, and the command 300 may be sent to network station 110 for processing. In the first case, command 300 is received by software 116 and provided to continuity module 302. In the second case, command 300 is received by a separate continuity module (not shown) which processes those commands in a manner similar to the process used by continuity module 302; however, the reporting scheme for the status of the processing of commands for the separate continuity module is designed to report to the requesting node 102. A description of continuity module 302 is provided below.

Continuity module 302 provides routines which evaluates the command 300 to determine whether the requested deletion, addition, amendment to a subscriber record, access 210, address 212, subscriber service 206, subscriber service profile 214 or other record can be implemented and does not violate any network configuration condition or boundary. (For the sake of brevity, collectively, the term "target record" refers to the subscriber record, access 210, address 212, subscriber service 206, subscriber service profile 214 or other record which has been submitted for amendment, deletion or addition to software 116.) If the command 300 does violate a condition or boundary which cannot be corrected, continuity module 302 rejects the command and issues an appropriate rejection statement to terminal 118 or to the node 102 originating the command 300, as appropriate. As the continuity module 302 of software 116 is implemented in C++, the continuity module 302 utilizes a series of objects, each of which provides condition and boundary limits for the respective target record. The objects include:

Subscriber Object—This object models the attributes of a subscriber such as name, organization, address etc.;

SubscriberService Object—This object models service definitions of a subscriber service 206 on a particular node 102, such as accounting parameters, connection descriptions and supplementary service attributes. The object is an association between five entities: a Subscriber Object, an access point, a SubscriberAddress Object and a SubscriberServiceProfile Object, mimicking the associations present for a subscriber service 206. A closed user group (CUG) subscription object (described later) is also associated with the SubscriberServiceProfile Object;

SubscriberServiceProfile Object—This object models a subscriberservice profile 214, which specifies bearer and supplementary services that may be assigned as a predefined set of services to a subscriber;

SubscriberAddress Object—This object models E.164 or AESA formatted directory numbers for a SubscriberService Object;

SubscriberAccess Object—This object models access 204 of a subscriber service 206;

CUG Subscription Object—This object is created when an association is made between a CUG-IC profile and a Subscriber Service (described below);

ATP Object—This object is models an address translation profile (described below); and ATPG Object—This object models an address translation profile group (described below).

If the change to the target record is accepted by continuity module 302, continuity module 302 sends the target record to database 112, requesting that database 112 update its records accordingly. A controller (not shown) for database 112 receives the request and initiate the updating of the relevant datafiles in database 112. The controller reports to continuity module 302 the status of the update request. If the update was not successful, continuity module 302 will provide an appropriate error report to the operator. If the update was successful, continuity module 302 generates and sends a change message 310 to change notification module 304 regarding the required change to be implemented relating to command 300. At that point, change notification module 304 has control of further processing of command 300.

Change notification module 304 is responsible for determining the scope of the effect of the implemented command 300 on target records. For example, if the command requires an amendment to a subscriber service 206, which is used by node 102A, then node 102A would have to update its local record of the affected subscriber service 206. Alternatively, there may be an instance where the effect of a command 300 requires only that the records in database 112 be updated. In the embodiment, this occurs when an operator makes a change to a record relating to a subscriber. Network station 110 is a node-centric information system and software 116 is responsible for maintaining current records for nodes 102. Accordingly, for the embodiment, a change to a subscriber record is updated in database 116, but the change information is not forwarded to the associated nodes 102. It will be appreciated that in other embodiments, updates to subscriber information may be provided to an associated node 102, if required. For the purpose of illustrating software 116, it is assumed that a change was made to a subscriber service 206 for node 102. Accordingly, change notification module 304 recognizes that a subscriber service 206 has changed. Next, change notification module 304 generates and sends an update message 312 to distribution module 306 containing the update information for subscriber service 206. In the embodiment, the message is sent via a socket to distribution module 306. When distributor 306 receives the update message 312, distributor 306 will process the update message 312.

Distributor 306 is responsible for updating any node 102 with an updated configuration record when a command 300 caused that configuration record to be updated. Accordingly, once the target record has been identified from update message 312, distributor 306 determines which affected node(s) 102 should receive the target record. Then, distributor 306 generates and sends update record 314 containing the target record to each associated node 102.

Distributor 306 utilizes the following process to identify which nodes 102 are associated with the contents of the update message 312 received from the change notification module 304. In order to facilitate identification and tracking of nodes 102, distributor 306 maintains a subscriber service (SS) list 316 of subscriber services 206. For example, list 316 contains an entry for subscriber service 206D. Also, distributor 306 maintains a SSP list 318 of SSPs 214. In SSP list 318, for each SSP 214 entry, there is a corresponding sublist 320 of nodes 102 to which SSP 214 was sent. For example entry 318A shows that SSP 214A was sent to nodes 102A and 102B. For each node 102 in sublist 320, there is a list of subscriber service 206 associated with it. For example, node 102A is associated with subscriber services 206A, 206B and 206D. Access to information in lists 316 and 318 use a hashing function on the value of the nodes. As will be recalled, a subscriber service 206 can only exist with one node 102 while a subscriber service profile 214 may reside on many nodes 102. Accordingly, when properties of SSP 216 are amended, the revisions must be provided to all affected nodes 102.

To establish lists 316 and 318, on initialization of network station 110, software 116 retrieves data on existing configuration of network 100 from database 112. This includes, amongst others, any existing files relating to subscriber service 206, SSP 214, address 202 and access 204 configurations. The retrieved files are analyzed and lists 314 and 316 (and other lists) are built from the analysis. For each subscriber service 206 retrieved from database 112, its corresponding access 204 provides the identity of the node 102 associated with it. This information is used to update the SSP 318, the CUG subscription list (described later) and the CUG-IC list (described later).

Using lists 316 and 318 (and others), distributor 306 can identify all associated nodes 102 relating to a received update message 312. There are three types of updates which can be contained in update message 312: an existing record is amended which does not affect the list of nodes associated with the existing record; an existing record is deleted, which may require deletion of a node from the list of nodes associated with the record; and a new record entry may be required, thereby requiring the addition of a node to the list of nodes associated with the record. Each type of message affects lists 316 and 318 (and others) differently. The effect of each message on lists 316 and 318 are described in turn.

First, when an existing record is amended which does not require amending the list of nodes associated with the record, the distributor 306 must identify all associated nodes 102 with the amended record and send the amended record to each of those nodes 102. For example, if a SSP 214 is amended, for example AAL information is updated (see Table A), SSP list 318 is scanned to find all nodes associated with the amended SSP 214. Each retrieved node 102 from SSP list 318 is sequentially sent update record 314. When a node 102 receives the update record 314, it replaces its local record relating information with the data in the update record 314. Upon completion of the update of the local record, node 102 sends a success message to distributor 306. If the local record could not be updated, node 102 sends a failure message to distributor 306. Upon receipt of a success message, distributor 306 identifies the source of the success message and marks the update of subscriber service profile 214 as complete. If a failure message is received, distributor 306 informs continuity module 302, via change message 310, following a database 112 update. Change notification module 304 receives the message, and processes it as it would process any other message requesting a change, as described above.

Second, when an existing record is deleted, distributor 306 must update its lists 316 and 318 (and others) to remove associations which refer to the deleted record. For example, if subscriber service 206D is decommissioned, its corresponding subscriber service list 316 entry must be removed and SSP list 318 entry must be updated accordingly. For SSP list 318, the subscriber service 206D reference must be removed. SSP list 318 is hashed, using the value of the identified node 102 from subscriber service 206D to locate the list 322 of subscriber services 206 associated with that node. Sublist 322 is updated to remove the entry for 206D. If sublist 322 is empty after the removal of the entry, then that particular SSP is no longer required by the node. Accordingly, then node entry in sublist 320 is removed. Further, a SSP removal message is sent in update record 314 to the affected node 102. The process of sending the update record 314 to node follows the process described earlier. Finally, if the removal of a node in sublist 320 causes the list of nodes to be empty, then that SSP 214 is removed from list 318.

Third, when a new record is added, distributor 306 must update its lists 316 and 318 (and others) to add associations with reference to the added record. For example, if subscriber service 206E is commissioned, a new entry will be created in subscriber service list 316. As a result, SSP list 318 must be updated. First, an entry is added to subscriber service list 316 relating to subscriber service 206F. If an entry for the SSP 214 exists in SSP list 318, the entry will be updated using the hashing function described above. Sublist 322 associated with the appropriate node 102 will be updated with a new entry for the newly commissioned subscriber service 206E. If SSP list 318 does not contain an entry for the associated SSP, then a new entry for the SSP is added to the list, with the appropriate node 102 entry and the appropriate new subscriber service 206E entry. Finally for either update, a SSP add message is sent in update record 314 to the affected node 102. The process of sending the update record 314 follows the process described earlier.

Distributor 306 maintains a copy in local RAM 324 of records which are used by multiple nodes 102. In the embodiment, the records include SSP 214 (and others). Use of local RAM 324 to store this information eliminates the need for distributor 306 to make multiple accesses to database 112 to retrieve information relating to the records. As database 112 is typically a hard disk drive system, the access time for distributor 306 to records contained in local RAM 324 compared with the access time for the comparable data in database 112 can be in the order of magnitudes faster. In order for the shadow image of the target records to be accurate, it is necessary that any updates made to records in database 112 are also performed on the corresponding records in local RAM 324. In the embodiment, records 326 for SSPs 214 are stored in RAM 324. To provide an indication of the success of updates sent to nodes 102 by distributor 306 via update records 314, records 326 in RAM 324 have a fault field 326A which contains a flag which is set by distributor 306. Upon receiving a failure message from a node 102 relating to a update record 314, distributor 306 marks the fault field 324A for the associated record as a failure. Distributor 306 then has a local record of the execution status of update record 314. If a failure message is received, distributor 306 informs continuity module 302, via change message 310, following a database 112 update. Change notification module 304 receives the message, and processes it as it would process any other message requesting a change, as described above.

From the above description, it will be seen that the embodiment provides a centralized system for downloading configuration updates to nodes 102 in network 100. Update records 314 are sent to only affected nodes 102 and are not broadcast to all nodes in network 100. Further, the above description illustrates a downloading and messaging system relating to subscriber service 206 and SSP 214 records. However, it will be appreciated that the downloads and message processing system provided in the embodiment may be used for groups of other types of records and information which need to be distributed to nodes 102. In particular, the embodiment uses the described downloading and message processing system for processing updated files for address translation and closed user groups (CUGs). Aspects of each are described in turn.

Figure 4:
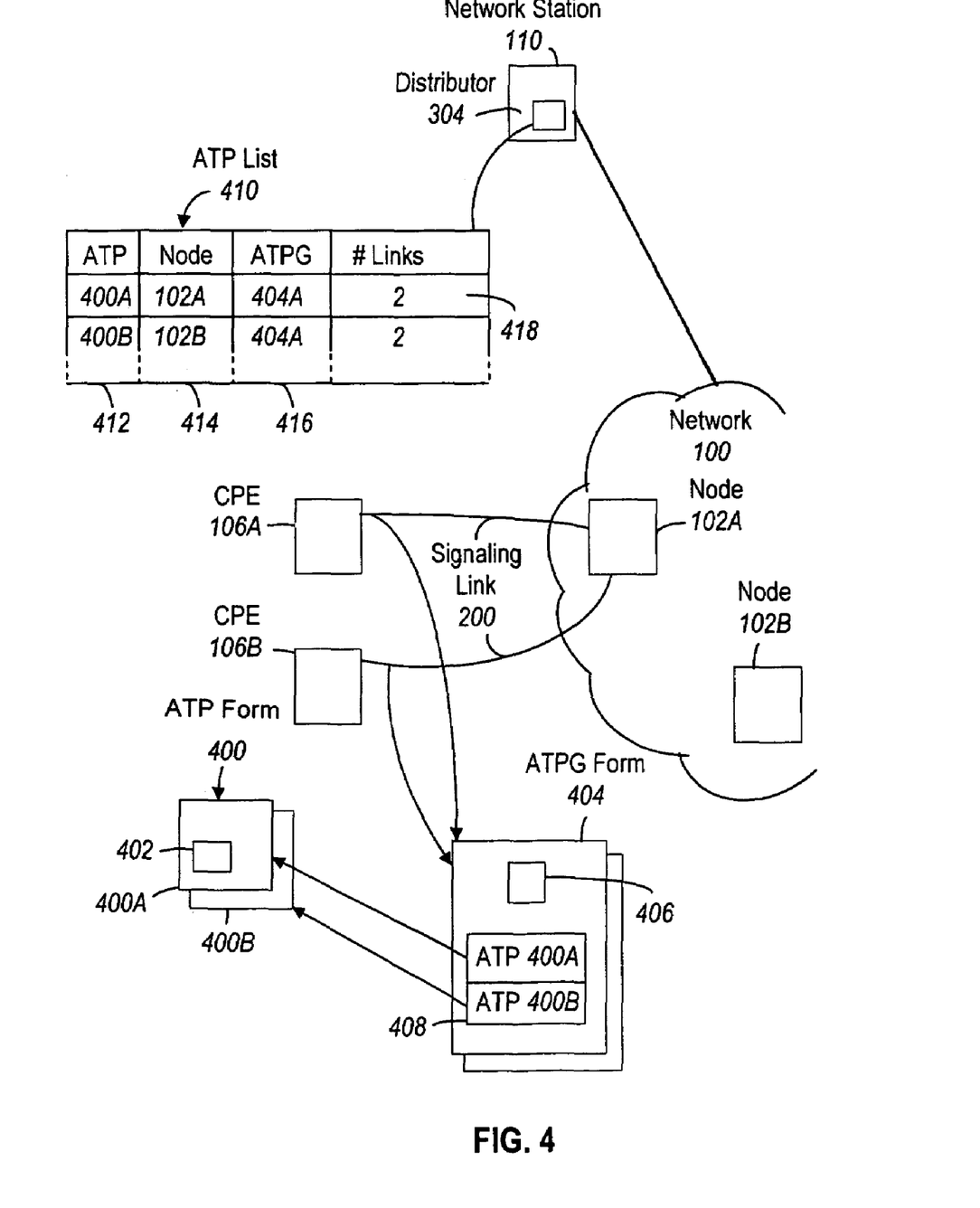
FIG. 4 is a block diagram of an address translation profile and an address translation profile group used in provisioning address translation by the network station of FIG. 1.

First, referring to FIG. 4, for address translation, as known to those skilled in the art, address translation is the process of re-mapping called and/or calling party addresses received on signalling links 200. This re-mapping may involve converting an address from one numbering plan identifier ("NPI")/type of number ("TON") to another and/or manipulating digits. By way of example, ATM signalling requires addressing in E.164 international or AESA numbering plans. Address translation occurs on both addressing plans independently. Address translation converts called and calling party addresses sent and received on signalling links to a supported address format; and inserts, removes and modifies address digits, or translates TON and NPI values.

Accordingly, address translation is achieved in the embodiment utilizing an address translation profile ("ATP"). An ATP contains address translation information for calling node 102 to a called node 102. Stored in network station 110 is an ATP 400 for each ATP profile processed by nodes 102 in network 100. The ATP 400 may comprise a number of parameters 402 including process called address, process calling address, external translation prefix, internal translation prefix, transport termination address ("TTA")/foreign transport termination address ("FTAA") and transport originating address ("TOA")/foreign transport originating address ("FTOA").

An Address Translation Profile Group (ATPG) is a group of ATPs 400 for a particular node 102. Accordingly, an ATPG is associated with one or more signalling links 200.

Network station 110 has a 404 for each ATPG used by nodes 102 in network 100. By way of example and not limitation, parameters 406 in the ATPG form may comprise attributes such as those listed below in Table C:

TABLE C

| Attribute Name | Description |
| --- | --- |
| ATPG Name | Name of ATPG |
| ATPG Index | Uniquely identifies the ATPG from the network station |
| ATPG Configuration Status | Configuration status of the table. |
| ATPs assigned to this ATPG | Contains all ATPs associated with this ATPGroup. Attributes are ATP Index and ATP Name. |
| Signalling Links using this ATPG | Contains signalling links associated with the table. Attributes are Node Name, Node Type, Node ID, Access Name, UNI Type (*, UNI-SL, Trunk_Group, IWP, NNI-SL, VPCL_PVC, VPCP_PVC), Status (Connected | Disconnected), Location (in the format of Node/Shelf/Slot/Port-VPI/FRL; VCI/DLCI). Also allows changing the association to a different Signalling Link |

ATPG 404 has ATP list 408 listing all ATPs 400 associated with the particular ATPG 404. For example, ATPG 404A is associated with ATP 400A and 400B. Network station 110 uses the ATPs and ATPGs to simplify management of address translation files. The relationship between elements in an ATP 400 to elements in an ATPG form 408 is analogous to the relationship of elements in a subscriber service 206 to elements in a SSP 214. In particular, in distributor 306, an ATP list 410 is a list of ATPs 400 and ATPGs 408 recognized by the network 100. List 410 is built and stored in distributor 306. ATP list 410 has a list in column 412 of ATPs 400. For each entry in list 412, there is an entry for the nodes 102 to which the ATP was sent in column 414. As an ATPG is associated with an ATP, list 410 has for each node entry in column 414, an entry in column 416 of the corresponding ATPG which contained the ATP (noted in column 412).

When a change is made to either an ATP 400 or an ATPG 404, distributor 306 uses list 410 to determine which nodes 102 are affected and sends appropriate update records 314 containing the updated ATP 400 information to the affected nodes 102.

Following are some examples of amendments made to the operation of a node 102 or its associated address translation parameters which require network station 110 to update the local ATP on node 102.

In the first example, an ATP 400 is associated with an ATPG 404. Therein, distributor 306 must identify all nodes 102 requiring ATPG 404. The newly associated ATP 400 will be sent to those identified node 102 as an update record 314 in a manner as described earlier.

In the second example, an ATP 400 is disassociated with an ATPG 404. Distributor 306 updates the ATP list 410 to remove the ATPG 404 from the ATPG sublist 416. For each node 102 in the ATP list associated with the deleted ATPG entry, an ATP removal message is sent in update record 314 the affected node 102. The process of sending the update record 314 follows the process described earlier. Further, if the removal of an ATPG entry 404 from the ATPlist 410 causes the list of nodes to be empty, then that ATP 400 is removed from the ATPG list 410.

In the third example, a signalling link 200 is associated with an ATPG 404. Therein, distributor 306 must identify the node 102 associated with stated endpoint of the signalling link 200 and send the node 102 the ATP 400 of the associated ATPG 404. The node 102 is sent an update record 314 in a manner as described earlier. The ATP list 410 is updated to include the new node in node list 414, with its appropriate ATP and ATPG associations.

To track the number of signalling links associated with an ATP 400, list 410 contains a counter 418. The counter identifies the number of signalling links 200 to which this ATPG has been associated. The distributor 306 increments counter 418 when a signalling link 200 is connected.

In the fourth example, a signalling link 200 is disconnected, distributor 306 updates the ATP list 410, and counter 418 is decremented. If the counter has a value of 0, then the distributor 306 updates ATP list 410 and removes the affected node 102 from the node sublist 414.

It will be appreciated that there are several methods of managing ATP 400 and ATPG 404. In an embodiment, the network station 110 manages ATPG 404 and ATP 400 as network-wide entities.

In an embodiment, an ATPG 404 can be associated with more than one signalling link 200 on different nodes 102, and only interested nodes 102 will be updated with ATPG changes.

In accordance with an embodiment, a maximum number of ATP 400, say 65,535, is supported in a global pool. A variable number of ATP forms 400 may be assigned to an ATPG 404 during configuration of network 100. However the total number of entries assigned to all lists on a node 102 cannot exceed the maximum defined for that node type. An ATP 400 may exist on different ATPGs 404 on a node 102.

Returning to a closed user group (CUG) information update system, a CUG provides a system allowing restrictions to be placed on nodes 102 and subscriber services 206 in network 100. A CUG provides the creation of multiple virtual networks within a network 100, for example, by using different combinations of access restrictions and privileges to subscriber services 206 in a CUG. Thus, subscriber services 206 of a CUG can communicate with each other, but may require access permissions to communicate with subscriber services 206 of other CUGs. Restrictions defined in a CUG may restrict access (i.e. the ability to send and receive communications) of a member to a member of another CUG. Similarly, privileges may be defined in a CUG for its subscribed members. In the embodiment a CUG-IC, through the list of CUG subscriptions has a list of associated subscriber services 206.

Figure 5A:
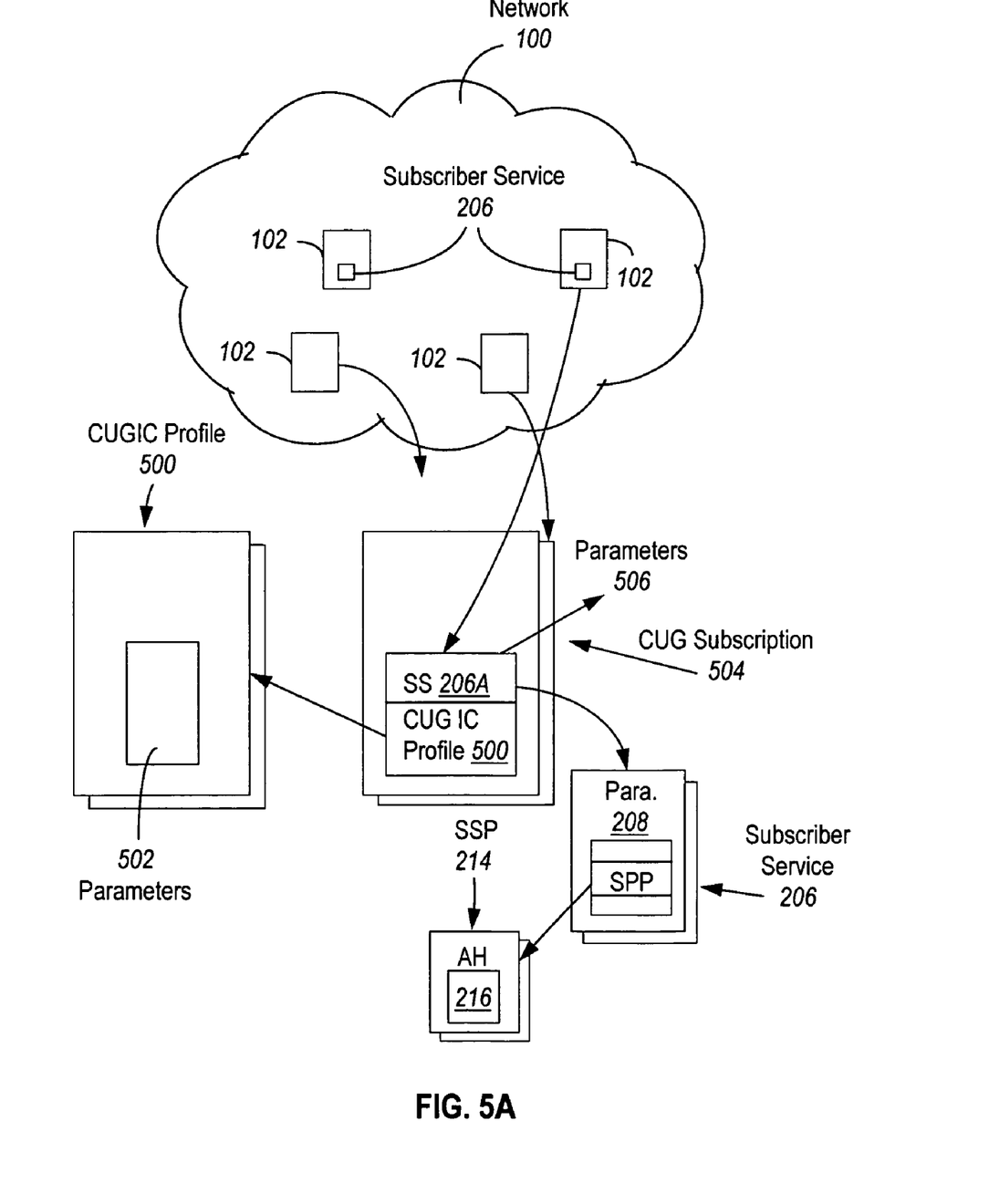
FIG. 5A is a block diagram of a closed user group interlock code (CUG-IC) profile and a CUG subscription used in provisioning user group restrictions and privileges for subscriber services in the network from the network station of FIG. 1.
Figure 5B:
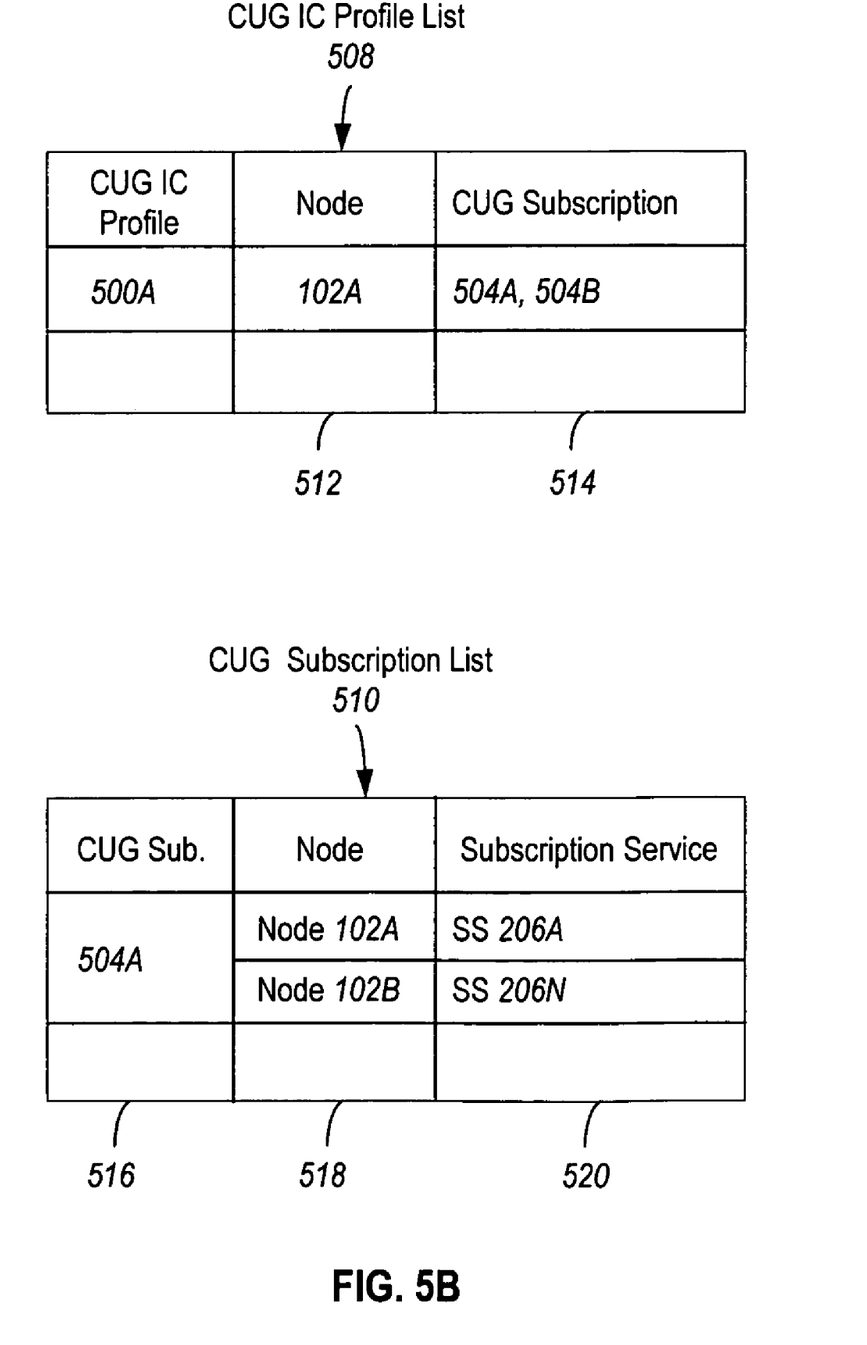
FIG. 5B is a block diagram of a (CUG) interlock code profile list and a CUG subscription list used by the network station of FIG. 1.

Referring to FIGS. 5A and 5B, in an embodiment, there are a series of CUG sets, known as CUG interlock code ("CUG-IC") profiles 500, associated with network 100. Each CUG-IC profile has a set of parameters 502 defining its restrictions and privileges. As an abstraction, a CUG-IC profile 500 defines a profile to which a series of subscriber services 206 can belong. Namely, CUG-IC profile 500, which is assoiacted with subscriber service 206, through a CUG subscription 504, will define a set of access privileges and restrictions per parameters 502 and 504 respectively. Accordingly, there can be many CUG-IC profiles 500 for a network 100, each of which may define different restrictions and privileges. A node 102, will locally store a record of the CUG-IC profile 500 associated with subscriber service 206 through CUG subscription 504.

Distributor 306 tracks CUG-IC profiles 500 and a CUG subscription 504. Accordingly, when changes are made to a CUG-IC profile 500 or a CUG subscription 504, the modified CUG-IC profile 500 or CUG subscription 504 may need to be updated downloaded to affected nodes 102 by distributor 306.

In distributor 306, in order to track relationships amongst subscriber services 206, CUG-IC profiles 500 and CUG subscriptions 504, distributor 306 builds and maintains a CUG-IC profile list 508 and a CUG subscription list 510. In CUG-IC profile list 508, each downloaded CUG-IC profile 500 is stored therein. For each CUG-IC profile 500, list 508 has a list of nodes 102 in column 512 to which the referenced CUG-IC profile was sent. Also, a list of CUG subscriptions associated with the particular node 102 and the referenced CUG-IC profile is stored in column 514. CUG subscription list 510 has a list of CUG subscription entries in column 516. For each CUG subscription entry, entries in column 518 list the nodes 102 associated with that particular CUG subscription entry. For each node entry, entries in column 520 list the subscriber services 206 associated with that particular node entry. It will be seen that CUG subscription list 510 is similar in form and function to SSP list 318. Accordingly, information may be extracted and updated for CUG subscription list 510 in a similar manner to the access and update methods described for SSP list 318. When a change is made to either a CUG subscription 504 or a CUG-IC profile 500, distributor 306 uses the CUG subscription list 510 and the CUG-IC profile list 508 to determine which nodes 102 are affected by the change and sends appropriate update records 314 containing the updated CUG subscription 504 or CUG-IC profile 500 file to the affected nodes 102.

Following are examples of amendments made to a CUG-IC profile 500 or a CUG subscription 504 which require network station 110 to update the local CUG-IC profile 500 and CUG subscription 504 on a node 102.

In the first example, a restriction or privilege is changed within a CUG-IC profile 500. Therein, distributor 306 must identify all nodes 102 associated with CUG-IC profile 500 and send to each of those nodes 102 the CUG-IC profile 500. The nodes are identified by accessing CUG-IC profile list 508. Each node 102 is sent an update record in a manner as described earlier.

In the second example, a subscriber service 206 is disassociated with a CUG-IC profile 500 by removing CUG subscription 504. Distributor 306 updates the CUG subscription list 510 to remove the target subscriber service 206 from the node list 518. For each node 102 associated with the disassociated CUG-IC profile 500, a removal message is sent in update record 314. The process of sending the update record 314 follows the process described earlier.

While the embodiment is used to update nodes 102 with files relating to generally, subscriber services 206, address translation files and CUG files, it will be appreciated that the process described for identifying and downloading particular records stored in distributor 306 to targetted nodes 102 can be used for other types of records.

It is noted that those skilled in the art will appreciate that various modifications of detail may be made to the present embodiment, all of which would come within the scope of the invention.

We claim:

1. A method for updating subscriber service information for customer premises equipment coupled through one or more nodes in a communications network to a network station, the method comprising:
    retrieving the subscriber service information from a remote database for updating at the network station and storing the subscriber service information in local memory of the network station for direct access thereto by the network station, the subscriber service information including one or more attributes;
    receiving at the network station directly from a user terminal coupled thereto an update to selected attributes of the one or more attributes of the subscriber service information;
    determining at the network station ones of the one or more nodes affected by the update from a list maintained by the network station, the list associating nodes with one or more attributes of the subscriber service information; and,
    distributing the update from the network station to only the ones of the one or more nodes affected by the update;
    wherein the one or more attributes include subscriber service profile information;
    wherein the subscriber service profile information includes a set of bearer and supplementary services;
    wherein the one or more attributes include address translation profile information for translating addresses for communications between the customer premises equipment and the one or more nodes;
    wherein the address translation profile information includes an identification of associated signalling links; and
    wherein the address translation profile information includes translation prefix information and termination address information.

2. The method of claim 1 and further comprising storing the subscriber service information in the local memory as managed objects within an object-oriented environment maintained by the network station.

3. The method of claim 1 wherein the one or more attributes include one or more of access information and address information.

4. The method of claim 1 wherein the one or more attributes include an indication of a group to which the customer premises equipment belongs.

5. The method of claim 1 wherein the update is updated subscriber service information.

6. The method of claim 1 and further comprising updating the list in accordance with the update.

7. The method of claim 5 and further comprising:
    storing a copy of the updated subscriber service information in the remote database; and,
    evaluating data continuity between the subscriber service information and the copy of the updated subscriber service information.

8. The method of claim 3 wherein the access information includes a port identifier and a link identifier for ones of the one or more nodes.

9. The method of claim 1 wherein the one or more attributes include information relating to a subscriber associated with the customer premises equipment.

10. The method of claim 1 wherein the one or more attributes include closed user group profile information for identifying restrictions and privileges associated with the customer premises equipment to thereby allow the customer premises equipment to be included in one or more virtual networks within the communications network.

11. A system for updating subscriber service information for customer premises equipment coupled through one or more nodes in a communications network to the system, the system comprising:
    a processor coupled to memory, an input device, and the communications network; and,
    modules comprised of computer readable code within the memory and executed by the processor, the modules including:

a module for retrieving the subscriber service information from a remote database for updating at the system and for storing the subscriber service information in local memory of the system for direct access thereto by the system, the subscriber service information including one or more attributes;

a module for receiving at the system directly from a user terminal coupled thereto an update to selected attributes of the one or more attributes of the subscriber service information;

a module for determining at the system ones of the one or more nodes affected by the update from a list maintained by the system, the list associating nodes with one or more attributes of the subscriber service information; and, a module for distributing the update from the system to only the ones of the one or more nodes affected by the update;

wherein the one or more attributes include subscriber service profile information;

wherein the subscriber service profile information includes a set of bearer and supplementary services;

wherein the one or more attributes include address translation profile information for translating addresses for communications between the customer premises equipment and the one or more nodes;

wherein the address translation profile information includes an identification of associated signalling links;

wherein the address translation profile information includes translation prefix information and termination address information.

12. The system of claim 11 and further comprising a module for storing the subscriber service information in the local memory as managed objects within an object-oriented environment maintained by the system.

13. The system of claim 11 wherein the one or more attributes include one or more of access information and address information.

14. The system of claim 11 wherein the one or more attributes include closed user group profile information for identifying restrictions and privileges associated with the customer premises equipment to thereby allow the customer premises equipment to be included in one or more virtual networks within the communications network.

* * * * *